(12) United States Patent
Ida et al.

(10) Patent No.: US 8,194,946 B2
(45) Date of Patent: Jun. 5, 2012

(54) ALIGNING APPARATUS, ALIGNING METHOD, AND THE PROGRAM

(75) Inventors: Noriaki Ida, Kanagawa-ken (JP); Yoshiyuki Moriya, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 1146 days.

(21) Appl. No.: 11/492,849

(22) Filed: Jul. 26, 2006

(65) Prior Publication Data

US 2007/0036410 A1 Feb. 15, 2007

(30) Foreign Application Priority Data

Jul. 28, 2005 (JP) ................................. 2005-218486
Sep. 2, 2005 (JP) ................................. 2005-255345

(51) Int. Cl.
*G06K 9/00* (2006.01)
*G06K 9/46* (2006.01)
*G06K 9/62* (2006.01)

(52) U.S. Cl. .......................... 382/128; 382/209; 382/190

(58) Field of Classification Search ........................ None
See application file for complete search history.

(56) References Cited

U.S. PATENT DOCUMENTS

| | | | | |
|---|---|---|---|---|
| 4,635,293 A * | 1/1987 | Watanabe | ...................... | 382/130 |
| 4,644,582 A * | 2/1987 | Morishita et al. | ............. | 382/130 |
| 5,187,754 A * | 2/1993 | Currin et al. | .................. | 382/284 |
| 5,251,271 A * | 10/1993 | Fling | ............................. | 382/162 |
| 5,649,032 A * | 7/1997 | Burt et al. | ...................... | 382/284 |
| 5,707,158 A * | 1/1998 | Hansel et al. | ................... | 400/61 |
| 5,969,753 A * | 10/1999 | Robinson | ....................... | 348/130 |
| 5,982,912 A * | 11/1999 | Fukui et al. | .................... | 382/118 |
| 6,075,905 A * | 6/2000 | Herman et al. | ............... | 382/284 |
| 6,078,701 A * | 6/2000 | Hsu et al. | ....................... | 382/294 |
| 6,101,238 A * | 8/2000 | Murthy et al. | .................. | 378/62 |
| 6,173,087 B1 * | 1/2001 | Kumar et al. | ................. | 382/284 |
| 6,393,163 B1 * | 5/2002 | Burt et al. | ...................... | 382/294 |
| 6,650,791 B1 * | 11/2003 | Cullen | ........................ | 382/294 |
| 6,750,873 B1 * | 6/2004 | Bernardini et al. | ........... | 345/582 |
| 6,793,390 B2 * | 9/2004 | Wang et al. | .................... | 378/174 |
| 6,834,128 B1 * | 12/2004 | Altunbasak et al. | .......... | 382/284 |
| 6,928,194 B2 * | 8/2005 | Mai et al. | ....................... | 382/284 |

(Continued)

FOREIGN PATENT DOCUMENTS

JP 10-137231 A 5/1998

(Continued)

OTHER PUBLICATIONS

Lin et al, "Map-Enhanced UAV Image Sequence Registration and Synchronization of Multiple Image Sequences", cvpr, pp. 1-7, IEEE Conference on Computer Vision and Pattern Recognition, 2007.*

(Continued)

*Primary Examiner* — Jingge Wu
*Assistant Examiner* — Avinash J Yentrapati
(74) *Attorney, Agent, or Firm* — Sughrue Mion, PLLC

(57) ABSTRACT

An aligning method and apparatus for aligning images having different imaged regions with improved alignment accuracy. Aligning the imaged region of each of a plurality of partial images with an overall reference image. Then, two images having an overlapping area are aligned with each other based on the amount of shift when one of the two images is aligned with the overall reference image, and the amount of shift when the other of the two images is aligned with the overall reference image.

9 Claims, 9 Drawing Sheets

U.S. PATENT DOCUMENTS

| | | | |
|---|---|---|---|
| 7,006,706 B2 * | 2/2006 | Sobel et al. | 382/284 |
| 7,184,062 B2 * | 2/2007 | Battle | 345/629 |
| 7,194,115 B2 * | 3/2007 | Uchida | 382/124 |
| 7,236,617 B1 * | 6/2007 | Yau et al. | 382/125 |
| 7,277,118 B2 * | 10/2007 | Foote | 348/36 |
| 7,756,358 B2 * | 7/2010 | Deng et al. | 382/294 |
| 2001/0019636 A1 * | 9/2001 | Slatter | 382/284 |
| 2002/0061132 A1 * | 5/2002 | Furukawa | 382/154 |
| 2002/0118893 A1 * | 8/2002 | Nguyen et al. | 382/294 |
| 2002/0168097 A1 * | 11/2002 | Neubauer et al. | 382/145 |
| 2003/0139659 A1 * | 7/2003 | Dale et al. | 600/407 |
| 2004/0066962 A1 * | 4/2004 | Sasa et al. | 382/141 |
| 2004/0071269 A1 * | 4/2004 | Wang et al. | 378/174 |
| 2005/0025365 A1 * | 2/2005 | Oosawa | 382/218 |
| 2005/0117796 A1 * | 6/2005 | Matsui et al. | 382/145 |
| 2005/0281454 A1 * | 12/2005 | Miyashita | 382/145 |
| 2006/0129038 A1 * | 6/2006 | Zelenchuk et al. | 600/322 |
| 2006/0239530 A1 * | 10/2006 | Oosawa | 382/130 |
| 2007/0038058 A1 * | 2/2007 | West et al. | 600/407 |

FOREIGN PATENT DOCUMENTS

JP  2002-248083 A  9/2002

OTHER PUBLICATIONS

Yoshito Tabata et al: "A registration method of CT and PET Images of bust area", Japan Journal of Medical Informatics, vol. 22, No. 6, pp. 706-707, Nov. 2002, (supplement of the 22nd Joint Conference on Medical Informatics).

* cited by examiner

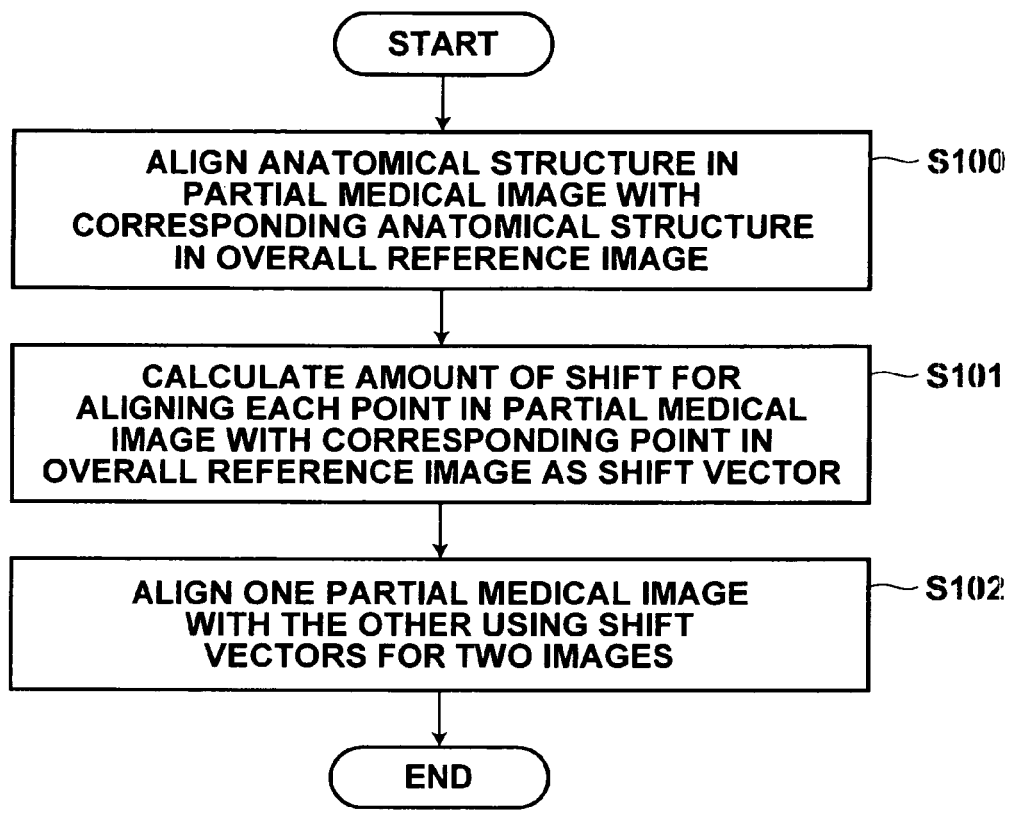

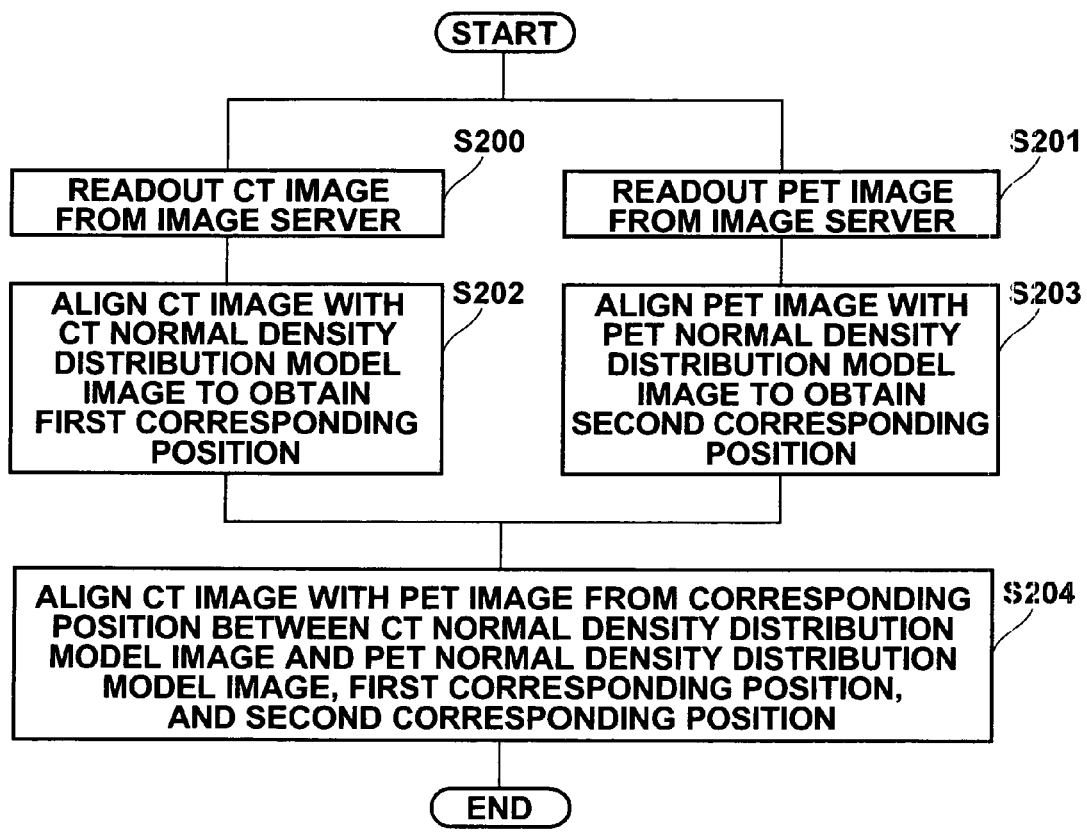

ALIGNING APPARATUS, ALIGNING METHOD, AND THE PROGRAM

BACKGROUND OF THE INVENTION

1. Field of the Invention

The present invention relates to an aligning apparatus, and an aligning method for aligning a plurality of medical images. The present invention also relates to a program for causing a computer to function as the aligning apparatus.

2. Description of the Related Art

When performing a comparative interpretation of radiation images of the same region of the same subject, one was obtained recently and the other was obtained, for example, a year ago, it has been known that it is effective to generate a differential image based on the difference between the two images using the temporal subtraction technique. When generating a differential image based on the difference between the two images using the temporal subtraction technique, it is important to accurately align the subjects in the images to observe the difference between the two images.

Recently, along with wider use of CT scanners and MRI machines, it is often the case in which diagnostic and treatment plans are developed by comparing tomographic images of the same subject. It is difficult to obtain the images with the subject having the same bodily posture and position if the images are obtained at different times, since the bodily postures and positions of the subject on the bed are not always the same. Further, when imaging the subject using a CT scanner or a MRI machine, the imaging conditions including slice thickness, slice pitch, image size, and the like may differ in each case. Therefore, image alignment has been conducted mostly by the doctors based on their knowledge and experience in the past. Consequently, the aligned position has differed slightly from doctor to doctor, which has prevented the image observation to be performed under the same conditions. Under these circumstances, an image aligning method having reproducibility without depending on the knowledge and experience of the doctors is proposed as described, for example, in Japanese Unexamined Patent Publication No. 10(1998)-137231. In the method, two images of a plurality of images are aligned based on the anatomical information such as bones or the like.

When diagnosing a respiratory function using images of a plurality of respiratory stages, it is difficult to directly align the image of maximum expiratory stage and that of the maximum inspiratory stage, since difference in the size of the lung fields is great due to three-dimensional movement of the ribs and diaphragm between the maximum expiratory stage and maximum inspiratory stage, and distances and directions also differ between the ribs and diaphragm. Consequently, a method in which the maximum expiratory stage and maximum inspiratory stage are gradually transformed into the intermediate stage is proposed as described, for example, in U.S. Patent Application Publication No. 20050025365.

Further, based on a three-dimensional image data which are the collection of a plurality of slice image data obtained by CT (Computer Tomography) or PET (Positron Emission Tomography), a cross-sectional image is often generated, or a three-dimensional image is displayed to find an affected area, or observe the state of the affected area for diagnosing the presence of a disease or the progress thereof. The three-dimensional image data include more data related to the subject compared with the conventional two-dimensional radiation image data, so that a more accurate diagnosis may be made. In addition, observation of images obtained by a plurality of different modalities allows to developing more accurate treatment plan.

The PET image is an image obtained after an isotope labeled agent is injected. In the PET, isotope labeled glucose is used as the agent (FDG). Cells use glucose as the source of energy. A cancer cell is more active than a normal cell, and takes up a larger amount of glucose as nutrition. Accordingly, it also absorbs a larger amount of FDG, and emits a larger amount of radiation compared with a normal cell. The amount of radiation is proportional to the amount of glucose absorbed by the tumor cell, i.e. activity of the cell, so that the PET may obtain an image reflecting the activity of the cancer cell area. In this way, the active cancerous lesion may be observed by the PET image. The PET image, however, has a low spatial resolution, causing the image to be blurred, so that it is difficult to correctly identify the position of the lesion using only the PET image. Consequently, treatment plan is usually developed using both a CT image, which allows accurate identification of the position and shape of the organs, and a PET image.

In the CT image, the positions and shapes of the organs appear clearly, while in the PET image, the shapes of the organs are blurred although an active cancerous lesion may be indicated. Thus, it is difficult to perform image alignment between the CT and PET images. Further, the alignment between CT and MRI images is also difficult, since no bones appear in the MRI image, although they appear in the CT image. As described above, different tissues appear in the images obtained by different modalities (clinical test equipment) Therefore, correct alignment of these images is difficult.

Consequently, an image aligning method that uses distinguishing shapes appearing in the images, such as lung fields or the like, when performing image alignment between the images obtained by different modalities is proposed as described, for example, Japan Journal of Medical Informatics, vol. 22, No. 6, pp. 706-707, 2002 (supplement of The 22nd Joint Conference on Medical Informatics).

Another method is also proposed as described, for example, in Japanese Unexamined Patent Publication No. 2002-248083, in which an image of a patient is obtained with a mask put on the patient. The mask has a protruding portion in which a marker is held. The marker appears in the image obtained by each modality, and a plurality of markers is provided, such as for CT/MRI, SPECT/CT, MRI/CT, and the like, since different markers appear in the images obtained by different modalities. When obtaining an image using each modality, the image is obtained with the mask having an appropriate marker for the modality in the protruding portion thereof is put on the patient. In this way, the data obtained by different modalities are aligned with reference to the marker.

The method disclosed in Japanese Unexamined Patent Publication No. 10(1998)-137231 is a method for performing alignment between two images. Thus, when performing alignment for three or more images, the alignment needs to be performed for each two images as shown in FIG. 10A. Accordingly, if the number of images is great, a great number of alignments are required.

Further, either method disclosed in Japanese Unexamined Patent Publication No. 10(1998)-137231, or U.S. Patent Application Publication No. 20050025365 is an image aligning method based on the assumption that the imaged region is substantially corresponding with each other. Therefore, if the imaged region differs significantly with each other, it is impossible to correctly align the images.

Still further, in the method disclosed in the non-patent document described above, it is necessary to know the effective tissue for the image alignment in advance for every combination of the modalities, and, what is more, the effective tissue for the image alignment is not always available. In addition, most of the tissues used for image alignment are soft tissues which may vary with the postural change of the subject, resulting in unfavorable alignment.

In the method disclosed in Japanese Unexamined Patent Publication No. 2002-248083, wearing the mask is burdensome for the patient. The aligning method using the marker is surely effective when images are obtained by a plurality of modalities at the same time frame. But, if the images are obtained, for example, by CT and PET at different time frames, it is difficult to have the subject wear the markers at the same position.

The present invention has been developed in view of the circumstances described above, and it is an object of the present invention to provide an aligning apparatus and an aligning method capable of accurately aligning images having different imaged regions, or images obtained by different modalities. It is a further object of the present invention to provide a program for causing a computer to function as the aligning apparatus.

SUMMARY OF THE INVENTION

An aligning apparatus of the present invention is an apparatus comprising:

a partial medical image storing means for storing a plurality of partial medical images, each obtained by imaging a predetermined region of a subject;

a reference image storing means for storing an overall reference image representing a normal anatomy of the anatomical structures of the entire subject;

a first aligning means for aligning an anatomical structure in the imaged region of each of the plurality of partial medical images with the corresponding anatomical structure in the overall reference image; and a second aligning means for aligning two partial medical images of the plurality of partial medical images having an overlapping area in the imaged region such that an anatomical structure in the overlapping area of one of the two partial medical images is aligned with the corresponding anatomical structure in the overlapping area of the other of the two partial medical images after:

the anatomical structure in the overlapping area of one of the two partial medical images is aligned with the corresponding anatomical structure in the overall reference image by the first aligning means; and the anatomical structure in the overlapping area of the other of the two partial medical images is aligned with the corresponding anatomical structure in the overall reference image by the first aligning means.

An aligning method of the present invention is a method comprising:

a partial medical image readout step for reading out a plurality of partial medical images, each obtained by imaging a predetermined region of a subject, and stored in a partial medical image storing means;

an overall reference image readout step for reading out an overall reference image representing a normal anatomy of the anatomical structures of the entire subject stored in a reference image storing means;

a first aligning step for aligning an anatomical structure in the imaged region of each of the plurality of partial medical images with the corresponding anatomical structure in the overall reference image; and a second aligning step for aligning two partial medical images of the plurality of partial medical images having an overlapping area in the imaged region such that an anatomical structure in the overlapping area of one of the two partial medical images is aligned with the corresponding anatomical structure in the overlapping area of the other of the two partial medical images after:

the anatomical structure in the overlapping area of one of the two partial medical images is aligned with the corresponding anatomical structure in the overall reference image by the first aligning step; and the anatomical structure in the overlapping area of the other of the two partial medical images is aligned with the corresponding anatomical structure in the overall reference image by the first aligning step.

A program of the present invention is a program for causing a computer to function as:

a partial medical image readout means for reading out a plurality of partial medical images, each obtained by imaging a predetermined region of a subject, and stored in a partial medical image storing means;

an overall reference image readout means for reading out an overall reference image representing a normal anatomy of the anatomical structures of the entire subject stored in a reference image storing means;

a first aligning means for aligning an anatomical structure in the imaged region of each of the plurality of partial medical images with the corresponding anatomical structure in the overall reference image; and a second aligning means for aligning two partial medical images of the plurality of partial medical images having an overlapping area in the imaged region such that an anatomical structure in the overlapping area of one of the two partial medical images is aligned with the corresponding anatomical structure in the overlapping area of the other of the two partial medical images after:

the anatomical structure in the overlapping area of one of the two partial medical images is aligned with the corresponding anatomical structure in the overall reference image by the first aligning means; and the anatomical structure in the overlapping area of the other of the two partial medical images is aligned with the corresponding anatomical structure in the overall reference image by the first aligning means.

The referent of "overall reference image" as used herein means an image representing a normal anatomy of anatomical structures, and including the imaged region of each of a plurality of partial images.

The referent of "overall reference image representing a normal anatomy of anatomical structures" as used herein means an image representing anatomical structures, such as organs, bones, and the like, in normal shapes, sizes, densities, or the like. Such image may be created for use by obtaining a normal shape, size, density, or the like of each of the anatomical structures based on the images obtained in the past.

The second aligning means described above may be a means for aligning the anatomical structure in the overlapping area of one of the two partial medical images with the corresponding anatomical structure in the overlapping area of the other of the two partial medical images by obtaining the amount of shift required for aligning the anatomical structures of the two partial medical images based on:

the amount of shift when the anatomical structure in the overlapping area of one of the two partial medical images is aligned with the corresponding anatomical structure in the overall reference image by the first aligning means, and the amount of shift when the anatomical structure in the overlapping area of the other of the two partial medical images is aligned with the corresponding anatomical structure in the overall reference image by the first aligning means.

When each of the plurality of partial medical images is a tomographic image obtained by tomography, the overall reference image may be a gray image in which anatomical structures obtained from multitudes of tomographic images obtained by tomography are represented in normal densities.

The referent of "tomographic image" as used herein means an image obtained by a tomography apparatus, such as CT scanner or MRI machine, and has three-dimensional image information.

Each of the plurality of partial medical image may be an image obtained at a different time.

Another aligning apparatus of the present invention is an apparatus comprising:

a first model image storing means for storing a first normal density distribution model image obtained by a first imaging apparatus, the first normal density distribution model image representing a plurality of anatomical structures in normal densities normally appearing on the images obtained by the first imaging apparatus;

a second model image storing means for storing a second normal density distribution model image obtained by a second imaging apparatus, the second normal density distribution model image representing a plurality of anatomical structures in normal densities normally appearing on the images obtained by the second imaging apparatus;

a first image storing means for storing a first image that includes an anatomical structure obtained by imaging a predetermined subject using the first imaging apparatus;

a second image storing means for storing a second image that includes an anatomical structure obtained by imaging the predetermined subject using the second imaging apparatus;

a first aligning means for aligning a corresponding anatomical structure between the first normal density distribution model image and the first image to obtain a first corresponding position;

a second aligning means for aligning a corresponding anatomical structure between the second normal density distribution model image and the second image to obtain a second corresponding position; and a corresponding position obtaining means for obtaining a corresponding position of the anatomical structure between the first and second images from a corresponding position of a corresponding anatomical structure between the first normal density distribution model image and the second normal density distribution model image, the first corresponding position, and the second corresponding position.

Another aligning method of the present invention is a method for use with an aligning apparatus that includes:

a first model image storing means for storing a first normal density distribution model image obtained by a first imaging apparatus, the first normal density distribution model image representing a plurality of anatomical structures in normal densities normally appearing on the images obtained by the first imaging apparatus;

a second model image storing means for storing a second normal density distribution model image obtained by a second imaging apparatus, the second normal density distribution model image representing a plurality of anatomical structures in normal densities normally appearing on the images obtained by the second imaging apparatus;

a first image storing means for storing a first image that includes an anatomical structure obtained by imaging a predetermined subject using the first imaging apparatus; and a second image storing means for storing a second image that includes an anatomical structure obtained by imaging the predetermined subject using the second imaging apparatus, the method comprising:

a first aligning step for aligning a corresponding anatomical structure between the first normal density distribution model image and the first image to obtain a first corresponding position;

a second aligning step for aligning a corresponding anatomical structure between the second normal density distribution model image and the second image to obtain a second corresponding position; and a corresponding position obtaining step for obtaining a corresponding position of the anatomical structure between the first and second images from a corresponding position of a corresponding anatomical structure between the first normal density distribution model image and the second normal density distribution model image, the first corresponding position, and the second corresponding position.

Another program of the present invention is a program for causing a computer to function as:

a first model image readout means for reading out a first normal density distribution model image obtained by a first imaging apparatus, the first normal density distribution model image representing a plurality of anatomical structures in normal densities normally appearing on the images obtained by the first imaging apparatus;

a second model image readout means for reading out a second normal density distribution model image obtained by a second imaging apparatus, the second normal density distribution model image representing a plurality of anatomical structures in normal densities normally appearing on the images obtained by the second imaging apparatus;

a first image readout means for reading out a first image that includes an anatomical structure obtained by imaging a predetermined subject using the first imaging apparatus, and stored in a first image storing means; and a second image readout means for reading out a second image that includes an anatomical structure obtained by imaging the predetermined subject using the second imaging apparatus, and stored in a second image storing means;

a first aligning means for aligning a corresponding anatomical structure between the first normal density distribution model image and the first image to obtain a first corresponding position; and a second aligning means for aligning a corresponding anatomical structure between the second normal density distribution model image and the second image to obtain a second corresponding position; and a corresponding position obtaining means for obtaining a corresponding position of the anatomical structure between the first and second images from a corresponding position of a corresponding anatomical structure between the first normal density distribution model image and the second normal density distribution model image, the first corresponding position, and the second corresponding position.

Here, the first imaging apparatus differs from the second imaging apparatus.

Each of the first normal density distribution model image, second normal density distribution model image, first image, and second image includes anatomical structures, such as bones and splanchnic tissues, and the like represented by data having unique density values according to the imaging apparatus (first or second imaging apparatus) used.

The density value is not limited to an optical density value, and any value may be used as long as it is capable of indicating a contrasting density of an image.

The referent of "normal density distribution model image" as used herein means a model image representing anatomical structures such as organs, bones, and the like, in normal density values which normally appear on the images obtained by a particular imaging apparatus (e.g., CT, PET, or MRI). Thus, the normal density distribution model image has a different density distribution depending on the type of the imaging apparatus. For example, even the same organ has different density and contrast values between three-dimensional images obtained by a CT scanner and a PET scanner respectively. Therefore, different model images are required for three-dimensional CT images and PET images respectively.

The first normal density distribution model image is a model image representing the normal density distribution normally appearing on the images obtained by the first imaging apparatus, and the second normal density distribution model image is a model image representing the normal density distribution normally appearing on the images obtained by the second imaging apparatus.

A corresponding position of a corresponding anatomical structure between the first normal density distribution model image and the second normal density distribution model image is the same coordinate position between the two images if they are aligned with each other in advance.

Further, the first or second imaging apparatus may be any of a CT scanner, a PET scanner, and a MRI machine.

According to the present invention, the imaged region of each of a plurality of partial medical images is aligned first with an overall reference image having a normal anatomy, then alignment between partial medical images is performed using the amounts of shift when the imaged regions of the partial medical images are aligned with the overall reference image, and the like. This allows partial medical images to be aligned even if the imaged regions in the respective partial medical images do not correspond with each other. Further, when multitudes of partial medical images need to be aligned, the number of combinations for two partial medical images to be aligned is generally increased. But the present invention may reduce the computation load by first aligning the partial medical images with the overall reference image.

The use of a gray image in which anatomical structures obtained from multitudes of tomographic images are represented in normal densities as the overall reference image allows correct alignment of anatomical structures by comparing the densities between the overall reference image which is represented by the gray image, and imaged region of a tomographic image.

Further, if each of the partial medical images is an image obtained at a different time, temporal changes between the partial medical images may be identified correctly through the aligning method of the present invention.

Still further, in the present invention, when images obtained by different modalities are aligned, normal density distribution model images, each having a density distribution specific to each of the modalities, and corresponding positions between the normal density distribution model images are stored. Then, the images obtained by different modalities are aligned first with the respective normal density distribution model images, and then they are aligned with each other based on the corresponding positions related with each other in advance between the normal density distribution model images. This allows more accurate structural alignment than in the case where the structures appearing in the images obtained by different modalities are aligned directly, since the image obtained by a particular modality and the normal density distribution model image for the modality have substantially identical density values.

BRIEF DESCRIPTION OF THE DRAWINGS

FIG. 3 is a flowchart for explaining the image alignment flow.

FIG. 12 is a flowchart illustrating the image alignment flow.

DESCRIPTION OF THE PREFERRED EMBODIMENTS

Figure 1:
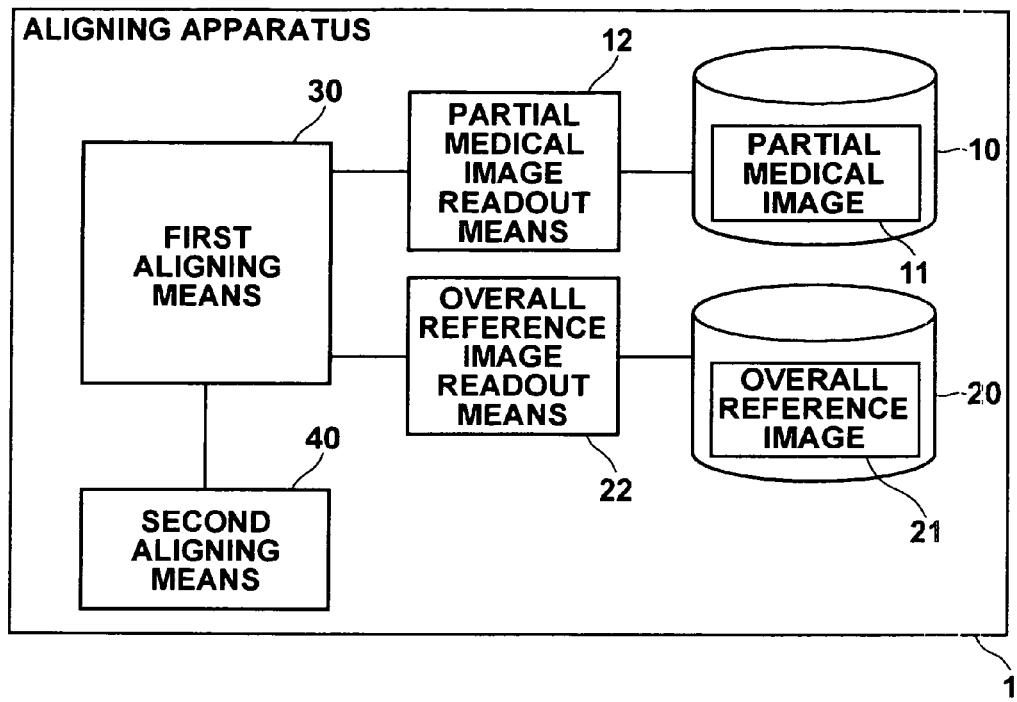
FIG. 1 is a block diagram of the aligning apparatus according to a first embodiment of the present invention.

Hereinafter, a first embodiment of the aligning apparatus of the present invention will be described with reference to accompanying drawings. As shown in FIG. 1, the aligning apparatus 1 according to the first embodiment includes: a partial medical image storing means 10 for storing a plurality of partial medical images 11, each obtained by imaging a predetermined region of a subject; a partial image readout means 12 for reading out the partial medical images 11 from the partial medical image storing means 10; a reference image storing means 20 for storing an overall reference image 21 representing a normal anatomy of the anatomical structures of the entire subject; and an overall reference image readout means 22 for reading out the overall reference image 21 from the reference image storing means 20. The apparatus further includes: a first aligning means 30 for aligning the imaged region in each of the plurality of partial medical images 11 with the corresponding region in the overall reference image 21; and a second aligning means 40 for aligning an overlapping area in the imaged region between two partial medical images of the plurality of partial medical images based on the amount of shift when the imaged region in one of the two partial medical images is aligned with the corresponding region in the overall reference image, and the amount of shift when the imaged region in the other of the two partial medical images is aligned with the corresponding region in the overall reference image by the first aligning means 30.

In the present embodiment, image alignment will be described in detail with reference to an example case in which tomographic images obtained by a tomography apparatus, such as CT scanner or the like, are aligned.

First, a method for creating the overall reference image 21 will be described. The overall reference image 21 is produced in advance and stored in the reference image storing means 20. The image 21 is created by obtaining average values for densities and positions of anatomical structures, such as organs, bones, and the like, from tomographic images obtained by imaging multitudes of subjects using a CT scanner, and creating a gray image representing the anatomical structures of the entire subject in normal densities and positions. Positional information of distinctive points on the gray image which may be used as the reference points for image alignment, such as points on the shoulder and thorax, pulmonary apex, branch point of bronchi, and contour of pulmonary lobes, is stored with the overall reference image 21. (More specifically, the method for extracting bronchi and contour of pulmonary lobes as described in IEICE Journal D-II, Vol. J87-D-II, No.1, pp 357-360, January, 2004 may be used.)

The partial medical image 11 is a tomographic image obtained by imaging a predetermined region of a subject by a CT scanner. Generally, when a doubtful shadow is found on a plain x-ray image, regional imaging is performed using a CT scanner to observe the questionable area in detail. The tomographic image obtained by the regional imaging in the manner as described above is stored in a storage unit (partial medical image storing means 10), such as an image server or the like, as the partial medical image 11.

Figure 2:
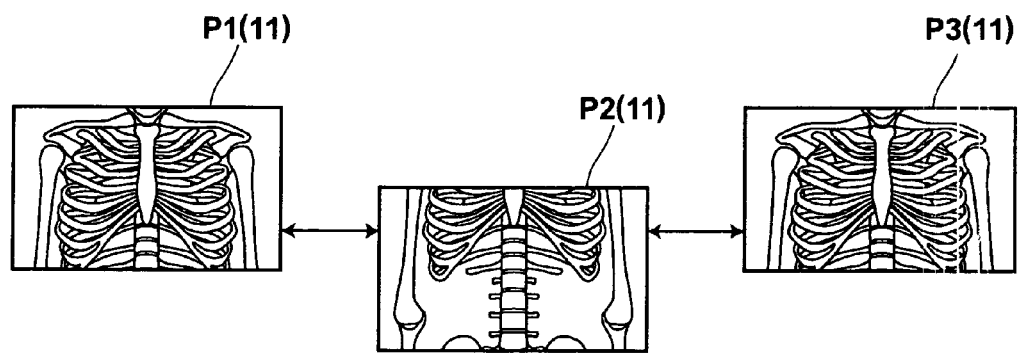
FIG. 2 is a drawing illustrating examples of partial medical images.

In the CT imaging, the subject receives a large amount of radiation, and hence the partial medical image 11 has only a limited area where the doctor wants to examine in detail. Consequently, in the case in which the chest of the same patient is diagnosed, CT imaged regions may slightly differ depending on the times when the images were obtained (respiratory difference and variation in the posture) and radiographers. For example, in images P1 to P3 obtained sequentially at different times, the image P1 has the region from the shoulders to the central part of the chest, image P2 has the region from the central part of the chest to the abdominal area, and the image P3 has the region again from the shoulders to the central part of the chest as shown in FIG. 2. Accurate image alignment between two partial medical images 11 having largely different regions with each other, like images P1 and P2, is difficult, since the distinctive points serving reference points differ largely with each other. Further, alignment of overlapping area between images P1 and P2 may not result in correct alignment.

Consequently, in the aligning method of the present embodiment, image alignment is performed first between the overall reference image 21 and each of partial medical images, then between the partial images. Hereinafter, the method of the present embodiment will be described in detail with reference to the flowchart in FIG. 3.

First, the first aligning means 30 reads out the partial medical images 11 stored in the partial medical image storing means 10 through the partial image readout means 12, and the overall reference image 21 stored in the reference image storing means 20 through the partial image readout means 12 to align an anatomical structure in the imaged region of each of the partial medical images 11 with the corresponding anatomical structure in the overall reference image 21 (S100).

Then, it automatically extracts distinctive points on the shoulders and thorax from the partial medical image, and relates them to the distinctive points on the overall reference image to perform general alignment. In addition, bones and organs appear on the image with unique density values. Thus, by comparing the contrasting density information between the overall reference image and partial medical image, detail alignment of the corresponding structure may be made.

Here, for the sake of simplicity, an example case in which two-dimensional chest images are aligned will be described in detail with reference to FIGS. 4 to 7.

Figure 4A:
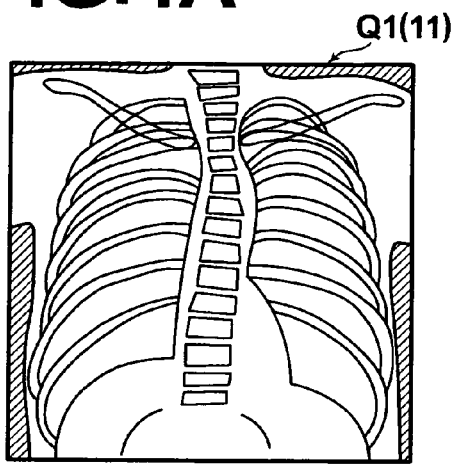
FIGS. 4A and 4B are drawings illustrating examples of partial image to be aligned and overall reference image (chest).
Figure 4B:
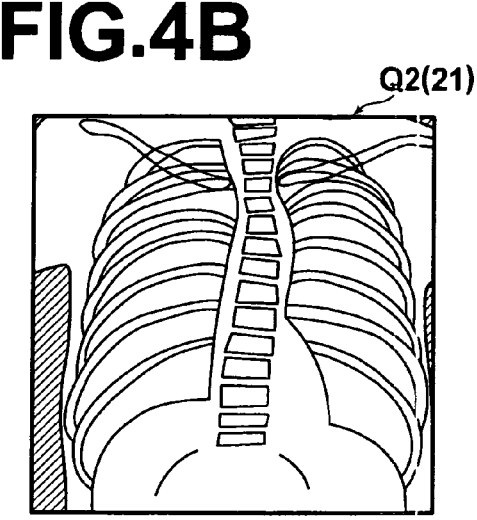
Figure 5A:
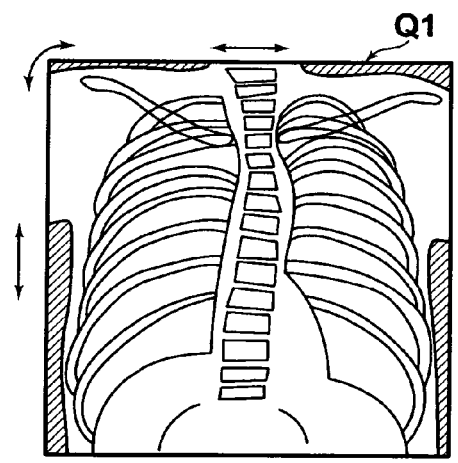
FIGS. 5A and 5B are drawing illustrating an example of general alignment.
Figure 5B:
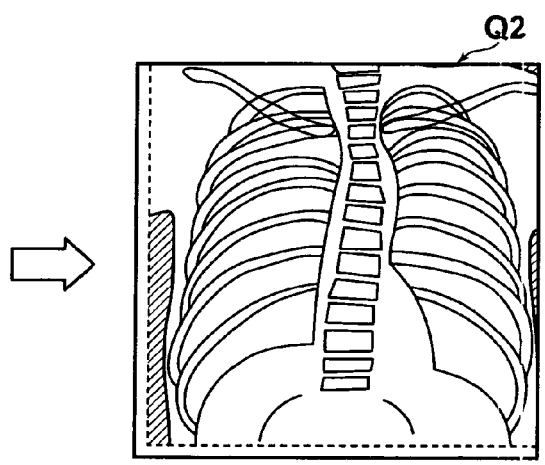
Figure 6A:
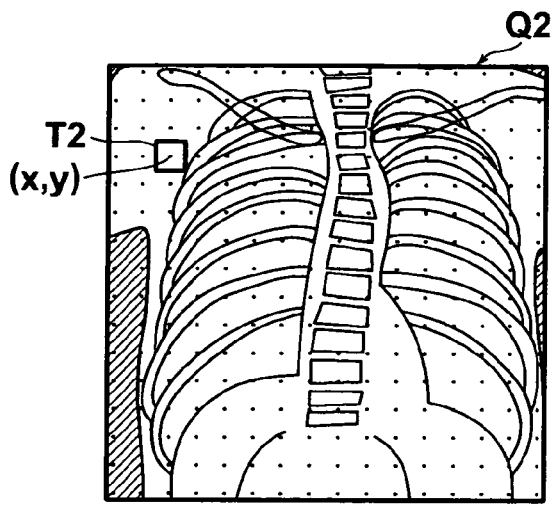
FIGS. 6A and 6B are drawings illustrating an example of local alignment.
Figure 6B:
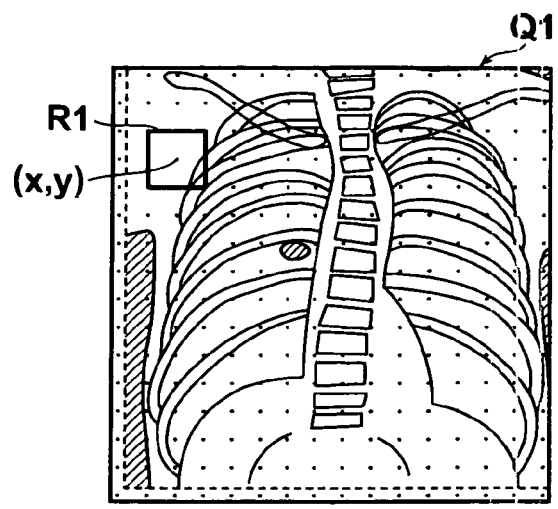
Figure 7:
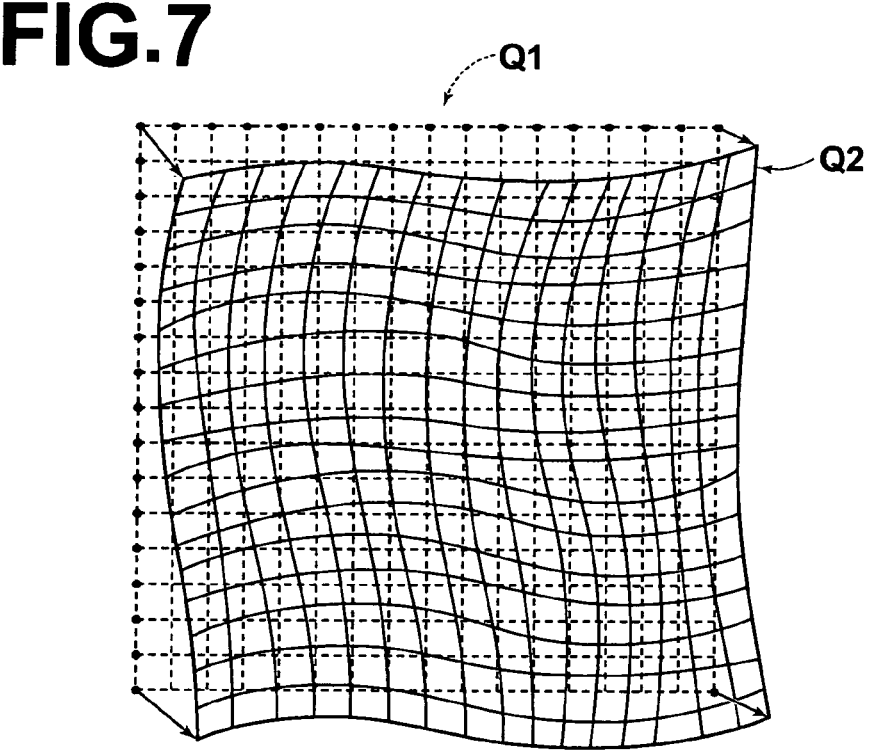
FIG. 7 is a drawing for explaining warping.

As shown in FIGS. 4A and 4B, the chest image in the partial medical image Q1 (11) (FIG. 4A) is generally aligned with the chest position in the overall reference image Q2 (21) (FIG. 4B, which shows only the chest portion included in the overall reference image.) Then, multitudes of local regions obtained by dividing the generally aligned image are aligned respectively. Normally, the partial medical image Q1 has the information of imaged region tagged thereto, so that it is known that the partial medical image Q1 is a chest image. Therefore, the thorax is detected from the partial medical image Q1 to extract distinctive points thereon. Based on the extracted distinctive points, and stored distinctive points of the overall reference image, affine transformation, including rotation, translation, scaling and the like is performed on the partial medical image Q1 to perform general alignment (FIG. 5A, 5B). Thereafter, as shown in FIG. 6A, the overall reference image Q2 is divided into multitudes of template regions T2, which are small rectangular regions (in the example shown in FIG. 6A, each template region is set with each point on the image as its center). Then, search regions R1 which are larger than the template regions T2 are set on the partial medical image Q1 to search the position on the image Q1 corresponding to each template region T2 on the image Q2 (in the example shown in FIG. 6B, each search region R1 is set with each point on the image as its center), and the search region R1 which matches the most with the template region T2 on the overall reference image Q2 is obtained. More specifically, the search region R1 whose contrasting density information matches the most with that of the template region T2 is obtained using a normalized cross-correlation value or the like. In this way, the positions in the partial medical image Q1 corresponding to the template regions on the overall reference image Q2 are obtained. Then, based on the relationship, warping like that shown in FIG. 7 (nonlinear warping) is performed on the entire affine-transformed partial medical image so that each of the regions on the partial medical image Q1 corresponds to each of the templates T2. Thereby, images Q1 and Q2 are aligned in detail (for more information, refer to Japanese Unexamined Patent Publication No. 2002-157593 filed by the present inventor, and the like).

So far the two-dimensional alignment has been described in detail as an example case. In the case in which a three-dimensional partial medical images 11 constituted by a plurality of tomographic chest images obtained by a CT scanner may be aligned in the similar way. That is, three-dimensionally distinctive points such as the thorax and the like are detected from the three-dimensional partial medical image 11. Then affine transformation or the like is performed on the thorax of the partial medical image 11 to generally align it with the overall reference image 21. Thereafter, the overall reference image 21 is divided into small template regions (e.g., cubic regions). Then, each of the search regions (larger than the template regions) set on the partial medical image 11 which matches the most with each of the template regions on the overall reference image 21 is obtained. Then, the partial medical image 11 is aligned with the overall reference image 21 by warping pixels on the partial medical image 11 to the corresponding positions on the overall reference image 21. Then, the amount of shift for aligning each point in the partial medical image 11 with the corresponding point in the overall reference image 21 is obtained as a shift vector (S101).

Figure 8:
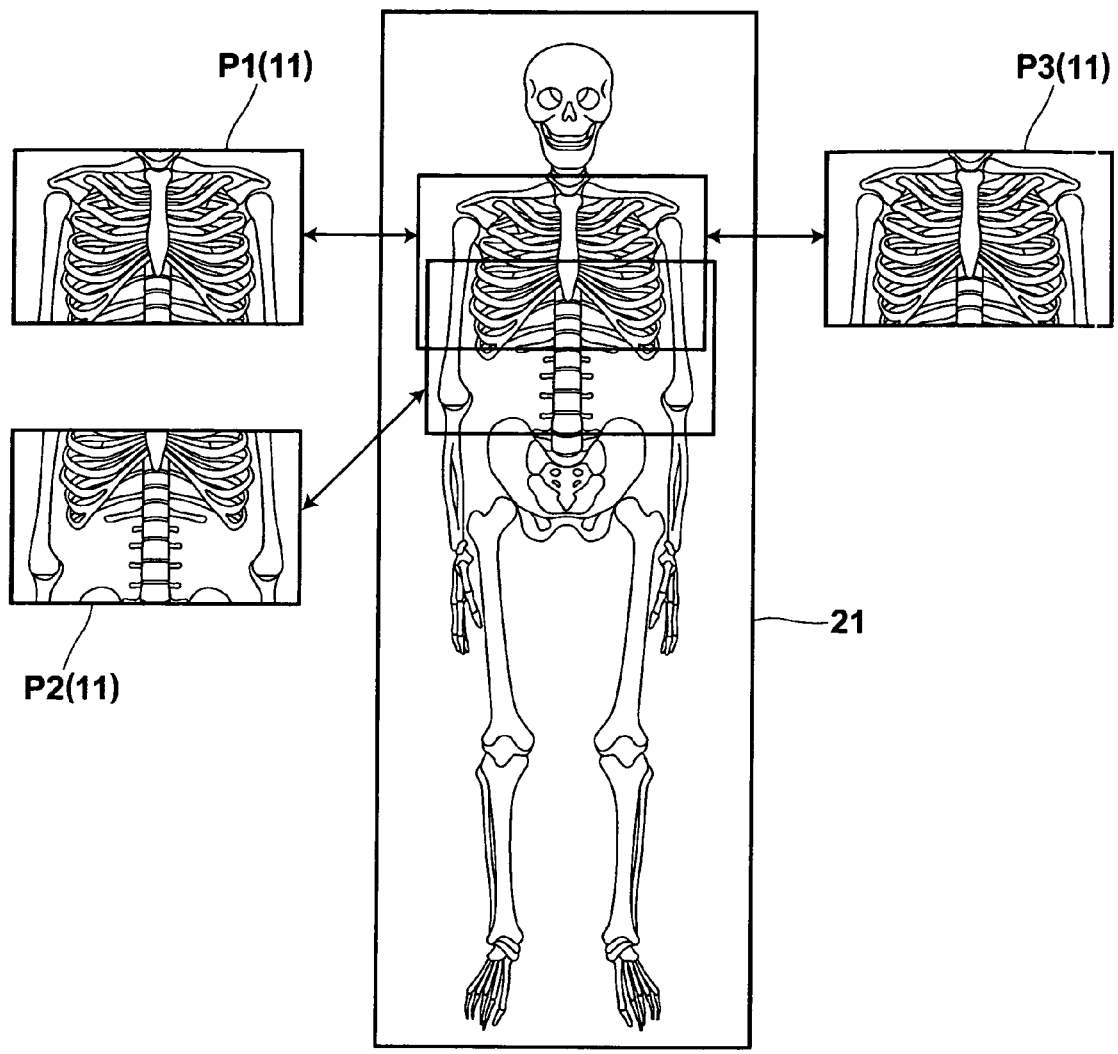
FIG. 8 is a drawing illustrating the positional relationship between the overall reference image and a plurality of partial medical images.

For example, for each of the partial medical images, like images P1 to P3 shown in FIG. 8, the shift vector for aligning an anatomical structure in the region of each of the partial medical images 11 with the corresponding anatomical structure in the overall reference image 21 is obtained. The shift vector for aligning the image P1 with the overall reference image 21 is stored in a file 1, the shift vector for aligning the image P2 with the overall reference image 21 is stored in a file 2, and the shift vector for aligning the image P3 with the overall reference image 21 is stored in a file 3.

By aligning each of the images P1 to P3 with the overall reference image 21 in the manner as described above, the overlapping area in the imaged region of each image may be identified correctly.

Then, for the overlapping area of the imaged region between the images P1 and P2, the overlapping area of the image P1 is aligned with that of the image P2 by the second aligning means using the shift vector stored in the file 1, and shift vector stored in the file 2 (S102).

Figure 9:
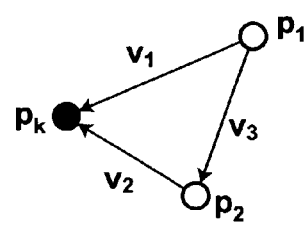
FIG. 9 is a drawing for explaining alignment using a shift vector.

For example, when the point in the image P1 corresponding to the point $P_k$ in the overall reference image 21 is $p_1$, and the point in the image P2 corresponding thereto is $p_2$, the shift vector for aligning the point $p_1$ in the image P1 with the point $P_k$ in the overall reference image 21 is $V_1$, and the shift vector for aligning the point $p_2$ in the image P2 with the point $P_k$ in the overall reference image 21 is $V_2$ as shown in FIG. 9. From the vectors $V_1$ and $V_2$, shift vector $V_3$ for aligning the point $P_1$ in the image P1 with the point $p_2$ in the image P2 is obtained as $V_3=V_1-V_2$. Thereby, the overlapping area between the images P1 and P2 is aligned.

Likewise, the overlapping area between the images P2 and P3, and between the images P1 and P3 maybe aligned using the shift vector.

Figure 10A:
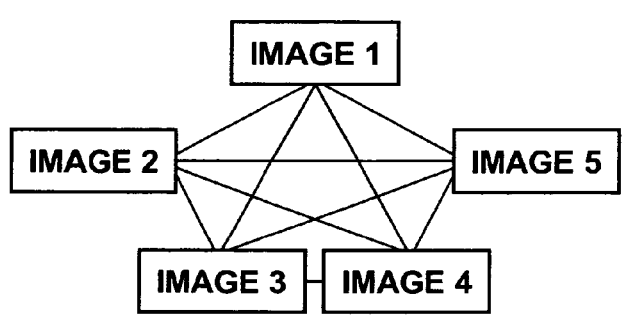
FIGS. 10A and 10B are drawings for explaining combinations of alignment of many partial images.
Figure 10B:
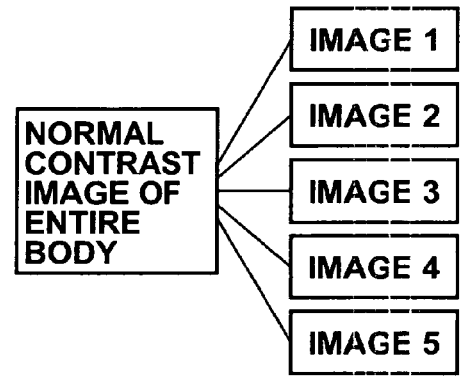

As described earlier in the explanation of the first aligning means 30, when aligning two images, distinctive points are extracted from the images for identifying a corresponding area, or image alignment is performed based on contrasting densities of the images. This requires complicated arithmetic operations with large computation load. When image alignment is performed directly between two images as in the past, like between images P1 and P2, images P2 and P3, and images P1 and P3, distinctive points are extracted from the two images, then local alignment is performed based on the contrasting densities of the images. Thus, as the number of images to be aligned increases, the number of combinations for image alignment increases as shown in FIG. 10A, resulting in increased computation load. Further, if the imaged region differs between the images, distinctive points to be extracted may differ, so that the alignment is unable to be performed. The method of the present embodiment may reduce the computation load by aligning the partial medical images 11 with the overall reference image 21 as shown in FIG. 10B. Further, if two images are aligned directly, the distinctive points extracted from the images are not always corresponding with each other. Thus, image alignment may result in a failure. In contrast, the distinctive points corresponding to the partial medical images are always present in the overall reference image 21, so that the images may be aligned without failure. The overlapping area between the partial medical images 11 having different imaged region may be correctly figured out through the overall reference image 21, so that alignment accuracy between the partial medical images may be improved.

When creating the overall reference image 21, "atlas" information which indicates the position and shape of each organ may be related to the image 21 and stored. If that is the case, when an affected area is detected by comparing the partial medical images 11, the organ having the affected area may be readily identified.

Preferably, the overall reference image 21 is a gray image of the entire subject body. But, it may be a gray image of the region from the chest to abdomen, or an entire body without the head, as long as it includes all the regions included in the partial medical images to be compared.

In the present embodiment, description has been made with reference to an example case in which the partial medical images are tomographyic images obtained by a CT scanner. But the partial medical images may be tomographyic images obtained by a MRI machine or the like.

Further, the partial medical images may be two-dimensional plain X-ray images instead of tomographic images. If the partial medical images are two-dimensional images, a two-dimensional overall reference image is provided for alignment.

Still further, the partial medical images to be aligned may be a tomographic image and a two-dimensional image. In this case, the tomographic image is projected into a two-dimensional image for the alignment with the two-dimensional overall reference image.

As described in detail above, the use of the method according to the present embodiment allows accurate alignment between images having different imaged regions. Further, many partial medical images may be aligned with less computation load.

Hereinafter, the aligning apparatus according to a second embodiment will be described with reference to accompanying drawings.

When the same region of the same subject is imaged by different modalities, each of the anatomical structures including organs, bones, and the like appearing on the images has different density values and contrasts. For example, a CT image obtained by a CT scanner indicates the accurate positions and shapes of the organs, while in a PET image obtained by a PET scanner, active tissues, such as a cancer cell and the like are emphasized, but shapes of the organs are not indicated clearly due to a low special resolution. Further, the density values are different between the CT and PET images, so that accurate image alignment is hardly achieved between the CT and PET images. Consequently, in the present embodiment, correct alignment between CT and PET images of a subject to be examined is performed through a CT normal density distribution model image, and a PET normal density distribution model image, which will be described in detail herein below.

Figure 11:
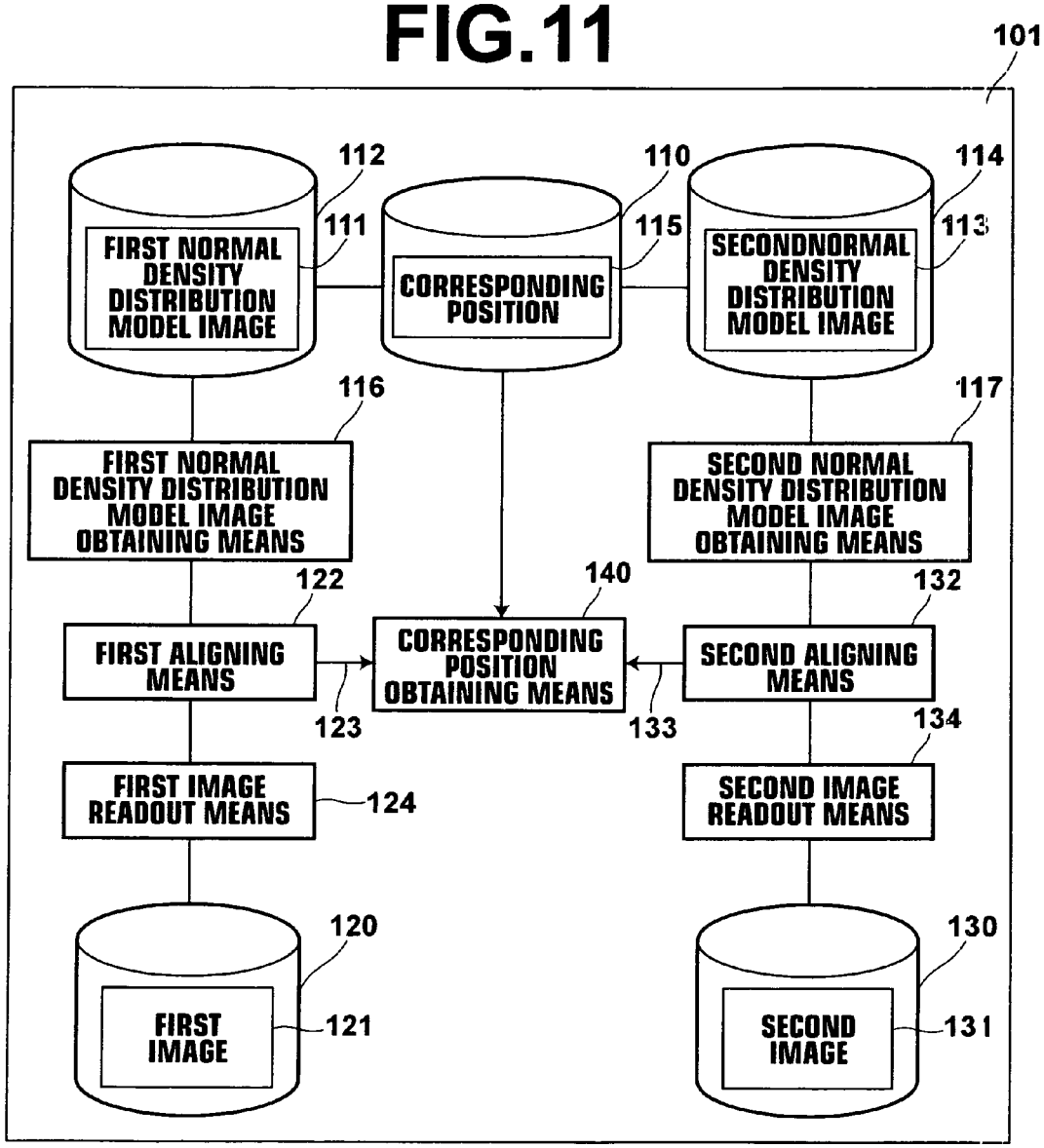
FIG. 11 is a block diagram of the aligning apparatus according to a second embodiment of the present invention.

As shown in FIG. 11, the aligning apparatus 101 according to the second embodiment of the present invention includes: a first normal density distribution model image storing means 112 for storing a CT normal density distribution model image 111 (first normal density model image) obtained by a CT scanner, and representing the normal density distribution of the image; a second normal density distribution model image storing means 114 for storing a PET normal density distribution model image 113 (second normal density model image) obtained by a PET scanner, and representing the normal density distribution of the image; a corresponding position storing means 110 for storing a corresponding position 115 of a corresponding anatomical structure between the CT normal density distribution model image 111 and PET normal density distribution model image 113; and a first image storing means 120 for storing a CT image 121 (first image) obtained by imaging a subject to be examined using a CT scanner. The apparatus further includes: a second image storing means 130 for storing a PET image 131 (second image) obtained by imaging the same subject using a PET scanner; a first aligning means 122 for aligning a corresponding anatomical structure between the CT image 121 and CT normal density distribution model image 111 to obtain a first corresponding position 123; a second aligning means 122 for aligning a corresponding anatomical structure between the PET image 131 and PET normal density distribution model image 113 to obtain a second corresponding position 133; and a corresponding position obtaining means 140 for obtaining a corresponding position of the anatomical structure between the CT image 121 and PET image 131 from the position 115 of the corresponding anatomical structure between the CT normal density distribution model image and PET normal density distribution model image, first corresponding position 123, and second corresponding position 133.

The CT image 121, PET image 131, CT normal density distribution model image 111, and PET normal density distribution model image 113 are volume data constituted by multitudes of voxel data. Each of the voxel data has density value information, and anatomical structures such as bones and organs are represented by contrasting densities of the voxel data.

The first image storing means 120 and second image storing means 130 are large capacity storage units, such as image servers or the like. The CT images 121 and PET images 131 of the subject to be examined are stored in the image server such that they may be retrieved as required.

The normal density distribution model images are model images representing the anatomical structures of a healthy subject in the normal density value distributions. The model images are provided based on the multitudes of CT images 121 and PET images 131 obtained in the past. The healthy subject has a normal body type with average sizes and locations of the tissues, such as organs and the like. Since density values of the images obtained by different modalities differ with each other, two model images are provided, i.e. the CT normal density distribution model image 111, and PET normal density distribution model image 113.

These normal density distribution model images may be created by obtaining average location and density value of each of the organs based on the multitudes of images obtained in the past. Preferably, the normal density distribution model images are created such that they are capable of indicating which voxel data belong to which anatomical structure (bone, organ, fat, or the like). For example, the CT normal density distribution model image 111 (CT_Model) may have coordinate value (x, y, z) to indicate the density value and tissue name as shown in Formulae (1) and (2) below, and stored in the first normal density distribution model image storing means 112.

$$\text{Density Value CT\_Model\_intensity } (x, y, z) = 100 \qquad (1)$$

$$\text{Tissue Name CT\_Model\_tissue } (x, y, z) = \text{Liver} \qquad (2)$$

Likewise, the PET normal density distribution model image 113 (PET_Model) may have coordinate value (x, y, z) to indicate the density value and tissue name as shown in Formulae (3) and (4) below, and stored in the second normal density distribution model image storing means 114.

$$\text{Density Value PET\_Model\_intensity } (x', y', z') = 80 \qquad (3)$$

$$\text{Tissue Name CT\_Model\_tissue } (x', y', z') = \text{Liver} \qquad (4)$$

The position of a corresponding anatomical structure between the CT normal density distribution model image 111 and PET normal density distribution model image 113 is stored in the corresponding position storing means 110 by relating each corresponding voxel data in advance. That is, the relationship expressed by Formula (5) shown below is obtained in advance.

$$\text{CT\_Model } (x, y, z) = \text{PET\_Model } (x', y', z') \qquad (5)$$

The corresponding position described above may be obtained manually in advance.

Hereinafter, the aligning method according to the present embodiment will be described with reference to the flowchart in FIG. 12.

First, a CT image 121 of a subject to be examined is read out from a storage unit (first image storing means 120), such as an image server or the like, by a first image readout means 124 (S200), and a PET image 131 of the same subject is read out from a storage unit (second image storing means 130), such as an image server or the like, by a second image readout means 134 (S201).

Then, the CT image 121 is aligned with the CT normal density distribution model image 111 by the first aligning means 122 (S202). Images obtained by the same modality have similar density distributions for the anatomical structures such as the organs and tissues. Consequently, more accurate image alignment may be made than for those obtained by different modalities.

Figure 13A:
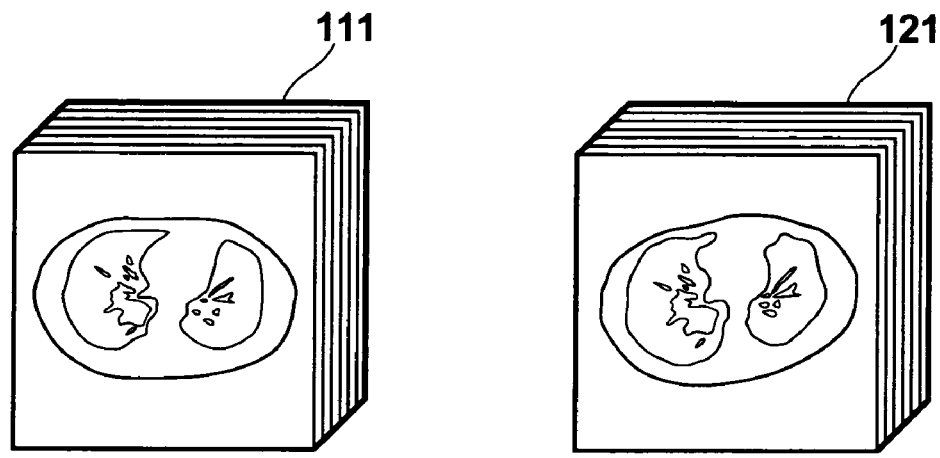
FIGS. 13A and 13B are drawings for explaining image alignment.
Figure 13B:
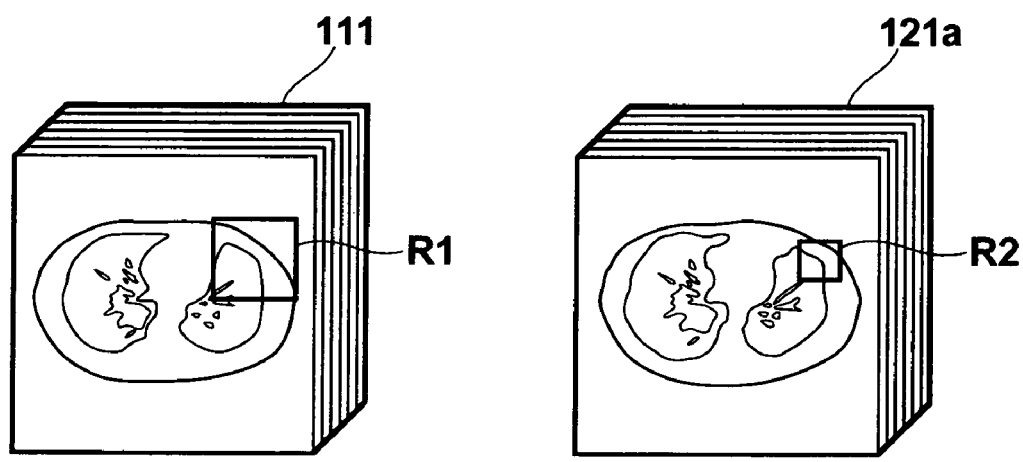

For example, the body surface of the CT image 121 is recognized based on the pixel values, and alignment is performed using warping technique or the like such that the recognized body surface shape is substantially corresponds to that of the CT normal density distribution model image 111 read out by a first normal density distribution model image readout means 116. Alternatively, distinctive points which are little dependent on individuals are extracted, and the alignment is performed such that the distinctive points correspond with each other. More specifically, three-dimensional affine transformation, such as translation, rotation, enlarging or reducing, is performed on the CT image 121 such that the body surface shape of the CT normal density distribution model image 111 and that of the CT image 121 shown in FIG. 13A correspond roughly with each other to obtain a CT image 121a shown in FIG. 13B. Then, a small region R2 (e.g., cubic shape) is set on the affine-transformed CT image 121a, and a search region R1 which is slightly larger than the small region R2 is set on the CT normal density distribution model image 111 at the position corresponding to the small region R2. The position that matches the most with the CT image 121 in the density value is searched on the CT normal density distribution model image 111 to obtain a first corresponding position where the anatomical structure corresponds accurately with each other.

Alternatively, a particular organ may be automatically extracted from the CT image 121, and aligned with the corresponding organ on the CT normal density distribution model image 111. (For more information related to automatic extraction of an organ, refer to, for example, Abstract of 21st Meeting of Medical Imaging Technology (CD-ROM Version, 20, 4, OP6-31 July 2002).

In this way, the first corresponding position between the CT image 121 (CT_Data) and CT normal density distribution model image 111 expressed by Formula (6) shown below may be obtained.

$$\text{CT\_Model } (x1, y1, z1) = \text{CT\_Data } (x, y, z) \qquad (6)$$

Likewise, the PET image 131 (PET_Data) is aligned with the PET normal density distribution model image 113 read out by a second normal density distribution model image readout means 117 (S203) to obtain the corresponding position expressed by Formula (7) shown below.

$$\text{PET\_Model } (x2, y2, z2) = \text{CT\_Data } (x', y', z') \qquad (7)$$

The corresponding position obtaining means 140 may obtain the coordinate value (x, y, z) of the CT image 121 and the coordinate value (x', y', z') of the corresponding PET image 131 from Formulae (5), (6), and (7). The alignment is performed between the CT image 121 and PET image 131 by obtaining the coordinate values for all of the voxel data (S204).

In the example case described above, the corresponding position between the CT normal density distribution model image 111 and PET normal density distribution model image 113 is stored first, and then the alignment is performed. If the two normal density distribution model images are already aligned with each other, and the same coordinate position corresponds with each other between the two normal density distribution model images, the CT image may be aligned with the PET image by simply aligning the CT image with the CT normal density distribution model image, and the PET image with the PET normal density distribution model image.

As described in detail, by aligning images obtained by respective modalities with respective normal density distribution model images, the images may be aligned accurately.

What is claimed is:

1. An aligning apparatus comprising:
   a partial medical image storing means for storing a plurality of partial medical images, each obtained by imaging a predetermined region of a subject;
   a reference image storing means for storing an overall reference image representing a normal anatomy of the anatomical structures of the entire subject;
   a first aligning means for aligning an anatomical structure in the imaged region of each of the plurality of partial medical images with the corresponding anatomical structure in the overall reference image; and
   a second aligning means for aligning two partial medical images of the plurality of partial medical images having an overlapping area in the imaged region such that an anatomical structure in the overlapping area of one of the two partial medical images is aligned with the corresponding anatomical structure in the overlapping area of the other of the two partial medical images after:
   the anatomical structure in the overlapping area of one of the two partial medical images is aligned with the corresponding anatomical structure in the overall reference image by the first aligning means; and
   the anatomical structure in the overlapping area of the other of the two partial medical images is aligned with the corresponding anatomical structure in the overall reference image by the first aligning means;
   wherein the overall reference image has average densities and positions of anatomical structures, obtained by imaging multitude of subjects; and
   wherein:
      each of the plurality of partial medical images is a tomographic image obtained by tomography;
      the overall reference image is a gray image in which anatomical structures obtained from multitudes of tomographic images obtained by tomography are represented in normal densities;
      the overall reference image represents the entirety of a human body; and
      the first aligning means performs positional alignment of the partial medical images with corresponding portions of the overall reference image, based on data regarding imaged portions attached to the partial medical images,
      wherein the overall reference image has recorded therein a plurality of feature points of a human body; and the first aligning means detects feature points in the partial medical images based on data regarding the imaged portions attached thereto, and employs the feature points within the overall reference image corresponding to the detected feature points to perform positional alignment, and
      wherein the feature points represent positional information of distinctive points to represent anatomical structure of the overall image.

2. The aligning apparatus according to claim 1, wherein the second aligning means is a means for aligning the anatomical structure in the overlapping area of one of the two partial medical images with the corresponding anatomical structure in the overlapping area of the other of the two partial medical images by obtaining the amount of shift required for aligning the anatomical structures of the two partial medical images based on:
   the amount of shift when the anatomical structure in the overlapping area of one of the two partial medical images is aligned with the corresponding anatomical structure in the overall reference image by the first aligning means, and
   the amount of shift when the anatomical structure in the overlapping area of the other of the two partial medical images is aligned with the corresponding anatomical structure in the overall reference image by the first aligning means.

3. The aligning apparatus according to claim 1, wherein each of the plurality of partial medical images is an image obtained at a different time.

4. The aligning apparatus according to claim 2, wherein each of the plurality of partial medical images is an image obtained at a different time.

5. An aligning method comprising:
   a partial medical image readout step for reading out a plurality of partial medical images, each obtained by imaging a predetermined region of a subject, and stored in a partial medical image storing means;
   an overall reference image readout step for reading out an overall reference image representing a normal anatomy of the anatomical structures of the entire subject stored in a reference image storing means;
   a first aligning step for aligning an anatomical structure in the imaged region of each of the plurality of partial medical images with the corresponding anatomical structure in the overall reference image; and
   a second aligning step for aligning two partial medical images of the plurality of partial medical images having an overlapping area in the imaged region such that an anatomical structure in the overlapping area of one of the two partial medical images is aligned with the corresponding anatomical structure in the overlapping area of the other of the two partial medical images after:
   the anatomical structure in the overlapping area of one of the two partial medical images is aligned with the corresponding anatomical structure in the overall reference image by the first aligning step; and
   the anatomical structure in the overlapping area of the other of the two partial medical images is aligned with the corresponding anatomical structure in the overall reference image by the first aligning step;
   wherein the overall reference image has average densities and positions of anatomical structures, obtained by imaging multitude of subjects; and wherein:
each of the plurality of partial medical images is a tomographic image obtained by tomography;
the overall reference image is a gray image in which anatomical structures obtained from multitudes of tomographic images obtained by tomography are represented in normal densities;
the overall reference image represents the entirety of a human body; and
the first aligning step comprises positional alignment of the partial medical images with corresponding portions of the overall reference image, based on data regarding imaged portions attached to the partial medical images,
wherein the overall reference image has recorded therein a plurality of feature points of a human body; and the first aligning step detects feature points in the partial medical images based on data regarding the imaged portions attached thereto, and employs the feature points within the overall reference image corresponding to the detected feature points to perform positional alignment, and wherein the feature points represent positional information of distinctive points to represent anatomical structure of the overall image.

6. A non-transitory computer-readable medium embodied with a program for causing a computer to function as:
a partial medical image readout means for reading out a plurality of partial medical images, each obtained by imaging a predetermined region of a subject, and stored in a partial medical image storing means;
an overall reference image readout means for reading out an overall reference image representing a normal anatomy of the anatomical structures of the entire subject stored in a reference image storing means;
a first aligning means for aligning an anatomical structure in the imaged region of each of the plurality of partial medical images with the corresponding anatomical structure in the overall reference image; and
a second aligning means for aligning two partial medical images of the plurality of partial medical images having an overlapping area in the imaged region such that an anatomical structure in the overlapping area of one of the two partial medical images is aligned with the corresponding anatomical structure in the overlapping area of the other of the two partial medical images after:
the anatomical structure in the overlapping area of one of the two partial medical images is aligned with the corresponding anatomical structure in the overall reference image by the first aligning means; and
the anatomical structure in the overlapping area of the other of the two partial medical images is aligned with the corresponding anatomical structure in the overall reference image by the first aligning means;
wherein the overall reference image has average densities and positions of anatomical structures, obtained by imaging multitude of subjects; and
wherein:
each of the plurality of partial medical images is a tomographic image obtained by tomography;
the overall reference image is a gray image in which anatomical structures obtained from multitudes of tomographic images obtained by tomography are represented in normal densities;
the overall reference image represents the entirety of a human body; and
the first aligning means performs positional alignment of the partial medical images with corresponding portions of the overall reference image, based on data regarding imaged portions attached to the partial medical images,
wherein the overall reference image has recorded therein a plurality of feature points of a human body; and the first aligning means detects feature points in the partial medical images based on data regarding the imaged portions attached thereto, and employs the feature points within the overall reference image corresponding to the detected feature points to perform positional alignment, and wherein the feature points represent positional information of distinctive points to represent anatomical structure of the overall image.

7. The aligning apparatus of claim 1, wherein the first aligning means performs alignment on the feature points representative of anatomical shape using affine transform of at least one of rotation, translation and scaling on the partial medical images.

8. The method of claim 5, wherein the first aligning step performs alignment on the feature points representative of anatomical shape using affine transform of at least one of rotation, translation and scaling on the partial medical images.

9. The computer readable medium of claim 6, wherein the first aligning means performs alignment on the feature points representative of anatomical shape using affine transform of at least one of rotation, translation and scaling on the partial medical images.

* * * * *